United States Patent [19]

Saotome et al.

[11] Patent Number: 4,754,137

[45] Date of Patent: * Jun. 28, 1988

[54] TOMOGRAPHIC TYPE PANORAMIC RADIATION IMAGE RECORDING AND READ-OUT APPARATUS

[75] Inventors: Shigeru Saotome; Masamitsu Ishida, both of Kanagawa, Japan

[73] Assignee: Fuji Photo Film Co., Ltd., Kanagawa, Japan

[*] Notice: The portion of the term of this patent subsequent to Jan. 26, 2005 has been disclaimed.

[21] Appl. No.: 791,865

[22] Filed: Oct. 28, 1985

[30] Foreign Application Priority Data

Oct. 27, 1984 [JP] Japan .................................. 59-226145

[51] Int. Cl.⁴ ........................... G03C 5/16; A61B 6/14
[52] U.S. Cl. ..................................... 250/327.2; 378/40
[58] Field of Search .................. 378/40, 39; 250/327.2

[56] References Cited

U.S. PATENT DOCUMENTS 4,039,837  8/1977  Ohta et al. ............................ 378/40

*Primary Examiner*—Carolyn E. Fields
*Attorney, Agent, or Firm*—Sughrue, Mion, Zinn, Macpeak and Seas

[57] ABSTRACT

A radiation image recording and read-out apparatus comprises a tomographic type panoramic image recording section and a read-out and erasing section positioned so that the image recording section is rotatable with respect to the read-out and erasing section. The image recording section comprises a radiation source rotatable around an object, and an image recording box positioned to face the radiation source and rotate around the object together with the radiation source for recording a radiation image on a stimulable phosphor sheet by moving the stimulable phosphor sheet in synchronization with rotation of the radiation source. The read-out and erasing section comprises an image read-out system, an erasing system, and a circulation and conveyance system for conveying the stimulable phosphor sheet from the image recording box to the image read-out system, and then to the image recording box.

5 Claims, 2 Drawing Sheets

TOMOGRAPHIC TYPE PANORAMIC RADIATION IMAGE RECORDING AND READ-OUT APPARATUS

BACKGROUND OF THE INVENTION

1. Field of the Invention

This invention relates to a radiation image recording and read-out apparatus comprising an image recording section, an image read-out section and an erasing section formed integrally with each other so that stimulable phosphor sheets are circulated and reused for recording a radiation image of an object. This invention particularly relates to a radiation image recording and read-out apparatus wherein tomographic type panoramic image recording is conducted at the image recording section.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet comprising the stimulable phosphor is first exposed to a radiation passing through an object to have a radiation image stored therein, and is then scanned with stimulating rays which cause it to emit light in proportion to the radiation energy stored. The light emitted from the stimulable phosphor sheet when the sheet is exposed to the stimulating rays is photoelectrically detected and converted to an electric image signal, which is processed as desired to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom in a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for use in the aforesaid radiation image recording and reproducing system and moves from place to place to record radiation images for mass medical examinations, it is disadvantageous to load a mobile X-ray diagnostic station with a number of stimulable phosphor sheets, and the amount of the stimulable phosphor sheets which can be loaded on the mobile X-ray diagnostic station is limited. Therefore, it is desired to load the mobile X-ray diagnostic station with stimulable phosphor sheets which can be used repeatedly, once store the radiation images of the objects in the stimulable phosphor sheets, transfer the electric image signals read out from the stimulable phosphor sheets into a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examination. This is very advantageous in practical use.

In order to reuse stimulable phosphor sheets as described above, the radiation energy remaining in the stimulable phosphor sheet after it is scanned with stimulating rays to read out the radiation image stored therein should be eliminated or erased by the method as described, for example, in Japanese Unexamined Patent Publication No. 56(1981)-12599 or U.S. Pat. No. 4,400,619. The stimulable phosphor sheet should then be used again for radiation image recording.

Accordingly, it is desired that there be combined into a single apparatus: an image recording section for exposing each circulatable and reusable sheet composed of a stimulable phosphor to a radiation passing through an object, an image read-out section for reading out the radiation image stored in the stimulable phosphor sheet, and an erasing section for erasing the radiation energy remaining on the stimulable phosphor sheet after the read-out step for the purpose of again recording another radiation image thereon. This is because such an arrangement would make it possible to easily load the apparatus on the mobile X-ray diagnostic station to conduct medical examinations at different locations. Such an apparatus could also be easily installed in a hospital or the like. This is very advantageous in practical use.

From the aforesaid viewpoint, the applicant proposed in U.S. patent application No. 600,689, now abandoned, a built-in type radiation image recording and read-out apparatus comprising an image recording section, an image read-out section and an erasing section combined into a single unit so that stimulable phosphor sheets are circulated and reused for image recording. In the radiation image recording and read-out apparatus, it is possible to circulate the stimulable phosphor sheets and to conduct radiation image recording, read-out and erasing continuously. However, since radiation image recording is conducted by use of various image recording apparatus in accordance with the type of the object, it is not always possible to circulate and reuse the stimulable phosphor sheets in all image recording apparatus, i.e. to constitute all image recording apparatus as the built-in type.

For example, a tomographic type panoramic image recording apparatus for recording a tomographic image of a denture jaws, jaw joints, face region or the like may be taken as an example. In the tomographic type panoramic image recording apparatus, a radiation source is secured to one end of an arm, and a cassette containing an X-ray film and an intensifying screen is secured to the other end of the arm. The radiation source and the cassette are positioned with an object intervening therebetween. The arm is rotated around the object while the cassette is exposed to a radiation passing through the object and a slit positioned between the radiation source and the cassette, thereby scanning the object with the radiation. Also, the cassette is moved in synchronization with the scanning speed, and a radiation image of a tomographic plane in the object is recorded.

When a stimulable phosphor sheet is used, instead of the aforesaid cassette, as the recording medium in the tomographic type panoramic image recording apparatus and a built-in type image recording and read-out apparatus is constituted by combining the panoramic image recording apparatus with an image read-out section and an erasing section, a complicated mechanism is required to rotate the section for holding the stimulable phosphor sheet at the image recording section and the heavy image read-out section and/or the erasing section around the object. Further, much energy is consumed for rotating them.

SUMMARY OF THE INVENTION

The primary object of the present invention is to provide a built-in type radiation image recording and read-out apparatus which generates a tomographic type panoramic image by use of a stimulable phosphor sheet and which has a simple mechanism and requires only a little energy for image recording.

Another object of the present invention is to provide a built-in type radiation image recording and read-out apparatus which improves operating efficiency in image recording and read-out.

The present invention provides a radiation image recording and read-out apparatus comprising:

(i) a tomographic type panoramic image recording section comprising (a) a radiation source for rotating around an object and emitting a radiation to said object, and (b) an image recording box positioned to face said radiation source with said object intervening between said image recording box and said radiation source and to rotate around said object together with said radiation source by maintaining the position with respect to said radiation source, and provided with a slit in a side face facing said radiation source for recording on a stimulable phosphor sheet an image of the radiation entering said image recording box via said slit while moving said stimulable phosphor sheet inside of said image recording box in synchronization with the rotation of said radiation source, and (ii) a read-out and erasing section comprising (a) an image read-out means provided with a stimulating ray source for emitting stimulating rays for scanning said stimulable phosphor sheet carrying the tomographic type panoramic radiation image at said image recording section, and a photoelectric read-out means for detecting light emitted by said stimulable phosphor sheet scanned with said stimulating rays and converting the emitted light into an electric image signal, (b) an erasing means for, prior to the next image recording on said stimulable phosphor sheet for which the image read-out has been conducted at said image read-out means, releasing the radiation energy remaining on said stimulable phosphor sheet, and (c) a circulation and conveyance means for conveying said stimulable phosphor sheet from said image recording box at said image recording section to said image read-out means and said erasing means, and then to said image recording box at said image recording section, said image recording section being rotatable with respect to said read-out and erasing section.

The radiation image recording and read-out apparatus in accordance with the present invention should preferably be constituted so that said image recording box at said image recording section is provided with a sheet holding means positioned inside of said image recording section for holding said stimulable phosphor sheet, moving said stimulable phosphor sheet in synchronization with the rotation of said image recording box together with said radiation source, and having said stimulable phosphor sheet store the tomographic type panoramic radiation image of said object, and a first conveyance port openable for carrying out conveyance of said stimulable phosphor sheet to and out of said sheet holding means, said read-out and erasing section is provided with a second conveyance port openable for carrying out conveyance of said stimulable phosphor sheet from said sheet holding means in said image recording box to said circulation and conveyance means and from said circulation and conveyance means to said sheet holding means, said first conveyance port and said second conveyance port face with each other with said image recording box and said read-out and erasing section being positioned close to each other at a predetermined position within the range of the rotation of said image recording box, and conveyance of said stimulable phosphor sheet is conducted between said sheet holding means and said circulation and conveyance means via said first conveyance port and said second conveyance port.

In the radiation image recording and read-out apparatus of the present invention, since the image recording section provided with the image recording box rotatable around an object together with the radiation source and the read-out and erasing section are formed integrally with each other, and the image recording section is rotated with the read-out and erasing section standing still, it is possible to simplify the mechanism and to conduct the image recording with only a little energy. Also, since the conveyance of the stimulable phosphor sheet is conducted at a predetermined position within the range of rotation of the image recording box, it becomes unnecessary to take out the stimulable phosphor sheet carrying a radiation image recorded at the image recording section, to insert the sheet into a cassette or the like, and to mount the cassette on the image read-out section for conducting image read-out as in the conventional apparatus. Thus since the stimulable phosphor sheet can be circulated and reused simply, it becomes possible to improve the operating efficiency and to increase the image recording speed.

DESCRIPTION OF THE PREFERRED EMBODIMENT

The present invention will hereinbelow be described in further detail with reference to the accompanying drawings.

Figure 1:
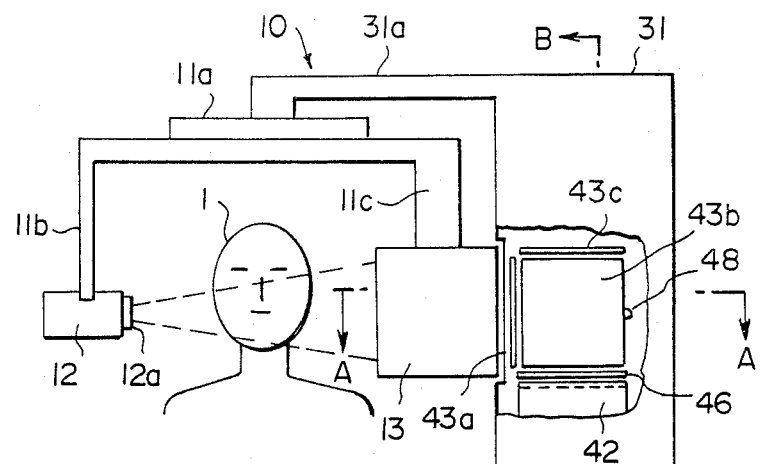
FIG. 1 is a front view showing an embodiment of the radiation image recording and read-out apparatus in accordance with the present invention.

FIG. 1 is a front view showing an embodiment of the radiation image recording and read-out apparatus in accordance with the present invention, which comprises an image recording section 10 and a read-out and erasing section 30.

Figure 2:
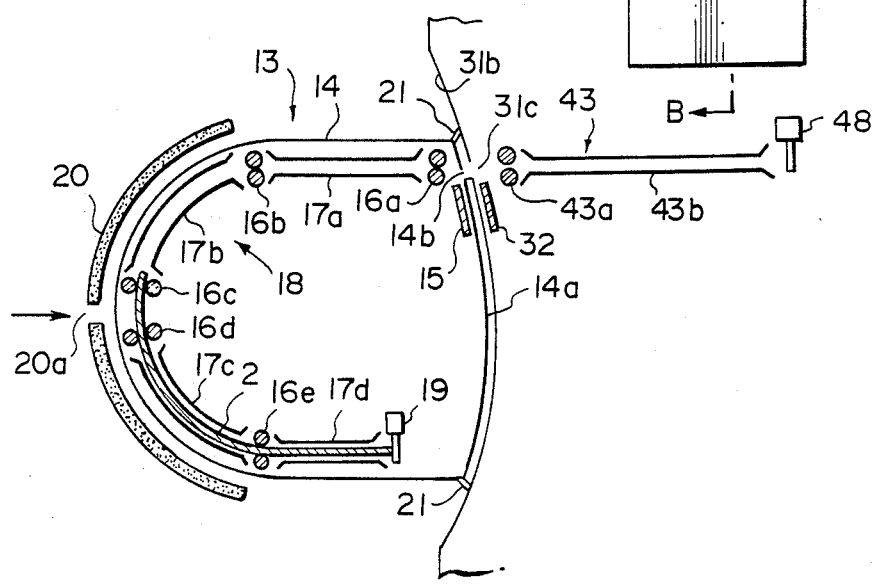
FIG. 2 is a sectional view showing a part of the apparatus of FIG. 1 and taken along line A—A of FIG. 1.

The image recording section 10 comprises a rotatable arm 11, a radiation source 12 secured to one end 11b of the rotatable arm 11 for emitting a radiation to an object 1, and an image recording box 13 secured to the other end 11c of the rotatable arm 11 and positioned to face the radiation source 12 via the object 1. In this embodiment, the radiation source 12 is provided with a slit, 12a for preventing the object 1 from being exposed to surplus radiation. The rotatable arm 11 is rotatably supported approximately at the center thereof by a supporting arm 31a projecting out of a main body case 31 of the read-out and erasing section 30 via a connecting section 11a. In order to prevent the object 1 from moving during image recording, there should preferably be positioned an object fixing member (not shown). As shown in FIG. 2, the image recording box 13 comprises a slit plate 20 having a slit 20a positioned to face the radiation source 12 via the object 1, and an image recording case 14 provided therein with rollers 16a to 16e and guides 17a to 17d for conveying a stimulable phosphor sheet 2. The image recording case 14 is fabricated of a material permeable to radiation and impermeable to light. A surface 14a of the image recording case 14 on the side facing the read-out and erasing section 30 is shaped in a cylindrical form with center at the rotation axis of the rotatable arm 11. Also, an outer surface 31b of the main body case 31 of the read-out and erasing section 30 facing the surface 14a is shaped in a cylindrical form with center at the rotation axis of the rotatable arm 11 and spaced at a predetermined distance from the surface 14a. Therefore, the image recording case 14 rotates within a predetermined rotation range in the spaced relation to the main body case 31 by the predetermined distance. The surface 14a of the image recording case 14 is provided with a first conveyance port 14b openable with a shutter 15. Also, the surface 31b of the main body case 31 is provided with a second conveyance port 31c openable with a shutter 32. The first conveyance port 14b and the second conveyance port 31c face each other at a predetermined position within the rotation range of the image recording box 13, i.e. at the position shown in FIG. 2. On the other hand, in the image recording case 14, a conveyance path 18 for guiding the stimulable phosphor sheet 2 along the inner surface of the image recording case 14 is constituted by the rollers 16a to 16e and the guides 17a to 17d. One end of the conveyance path 18 faces the first conveyance port 14b, and a positioning sensor 19 for the stimulable phosphor sheet 2 is positioned at the other end of the conveyance path 18.

When tomographic type panoramic image recording is conducted at the image recording section 10, operations are carried out as described below. First, as shown in FIG. 2, the image recording box 13 is positioned at the predetermined position where the first conveyance port 14b and the second conveyance port 31c face each other, and the shutter 15 of the first conveyance port 14b and the shutter 32 of the second conveyance port 31c are opened. Then, the stimulable phosphor sheet 2 after erasing of the remaining radiation energy is conveyed by a circulation and conveyance means described later onto the conveyance path 18 via the second conveyance port 31c and the first conveyance port 14b. In order to prevent entry of external light from the first conveyance port 14b and the second conveyance port 31c, a light shielding plate 21 is positioned between the surface 14a of the image recording case 14 and the surface 31b of the main body case 31. When the stimulable phosphor sheet 2 is conveyed onto the conveyance path 18, the shutters 15 and 32 are closed, and the stimulable phosphor sheet 2 is conveyed until it contacts the positioning sensor 19 and held at this position. Thereafter, a radiation is emitted by the radiation source 12 to the object 1 at an angle of approximately 7° from below with respect to the horizontal line, and at the same time the rotatable arm 11 is rotated at a predetermined speed. Thus the stimulable phosphor sheet 2 held on the conveyance path 18 is exposed to the radiation passing through the slit 21a. The sheet 2 is moved on the conveyance path 18 in synchronization with the rotation of the rotatable arm 11, i.e. in synchronization with the rotation speed of the radiation source 12. Therefore, a tomographic type panoramic radiation image of a tomographic plane of the object 1 at which the scanning speed coincides with the sheet movement speed is stored in the sheet 2. In this manner, it is possible to record panoramic image of a tomographic plane of e.g. a denture.

The rotation of the rotatable arm 11 may be conducted around the rotation axis at the center of an object in the circular form (pantomography). When the object is not circular as in the case of a denture, the rotation axis may be moved during image recording so that the radiation impinges upon the object always in the plus direction with respect to the object (orthopantomography). After the image recording is completed, the rotatable arm 11 and the image recording box 13 are rotated up to the predetermined position where the first conveyance port 14b and the second conveyance port 31c face each other. The shutters 15 and 32 are opened, and the stimulable phosphor sheet 2 is conveyed into the read-out and erasing section 30 via the first conveyance port 14b and the second conveyance port 31c.

Figure 3:
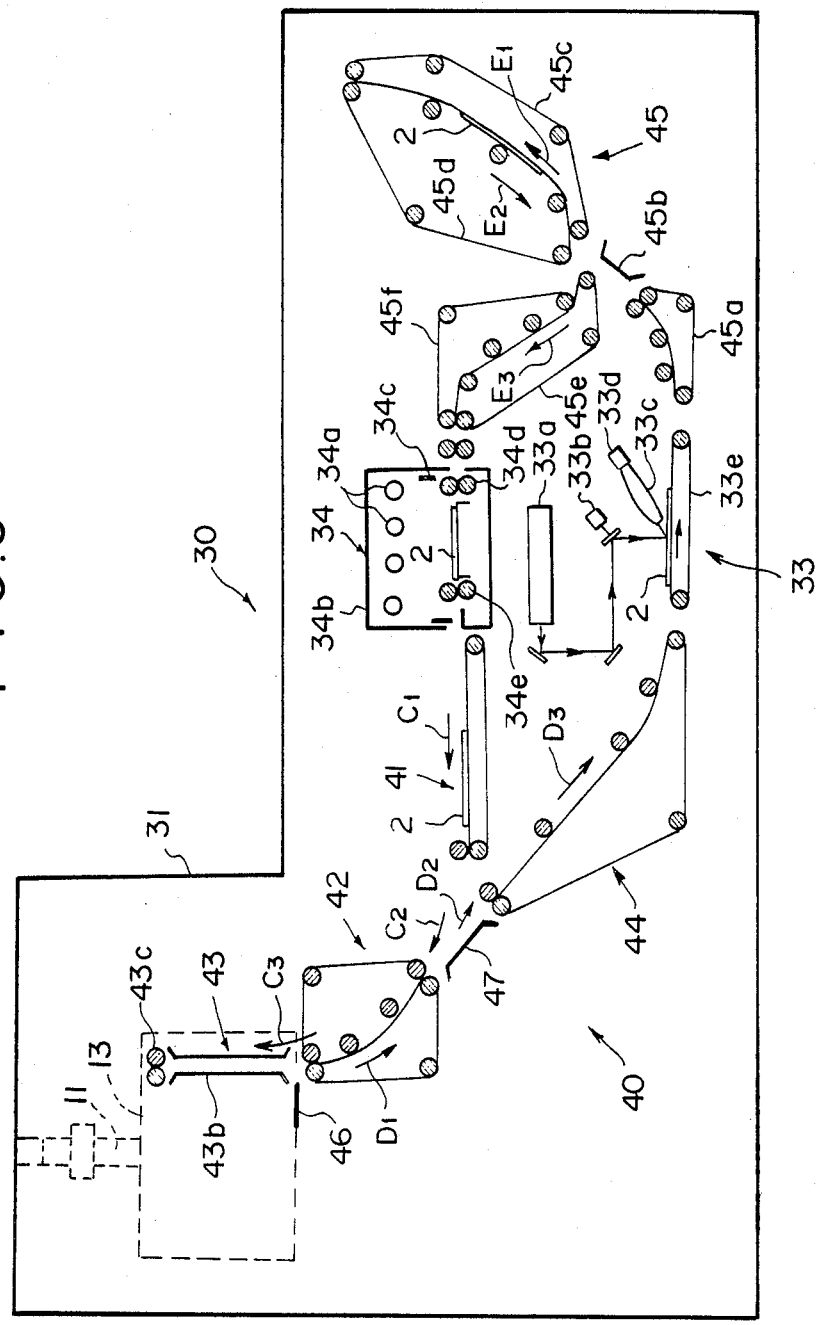
FIG. 3 is a sectional view taken along line B—B of FIG. 1.

The read-out and erasing section 30 will be described below with reference to FIG. 3 which is a sectional view taken along line B—B of FIG. 1. The read-out and erasing section 30 comprises an image read-out means 33, an erasing means 34 and a conveyance means 40. At the image read-out means 33, a laser beam source 33a is positioned above a conveyor belt 33e constituting the image read-out means 33, and a galvanometer mirror 33b is positioned for scanning a laser beam emitted by the laser beam source 33a in the width direction of the stimulable phosphor sheet 2 on the conveyor belt 33e. By reciprocating swinging of the galvanometer mirror 33b, the laser beam is scanned on the sheet 2 carrying a radiation image stored therein in a main scanning direction. The sheet 2 is exposed in advance to the radiation to record the radiation image therein at the image recording section 10 and is then conveyed by the sheet circulation and conveyance system to the image read-out means 33. Light emitted by the sheet 2 upon exposure to the laser beam enters a light guide member 33c from its light input face directly or after being reflected by a light guiding reflection mirror positioned when necessary along the main scanning direction. The light entering the light guide member 33c is guided inside thereof through total reflection and received by a photomultiplier 33d closely contacted with a light output face of the light guide member 33c. Thus the light is detected photoelectrically. Simultaneously with the scanning of the sheet 2 with the laser beam in the main scanning direction, the sheet 2 is conveyed by the conveyor belt 33e in the sub-scanning direction as indicated by the arrow at the image read-out means 33, i.e. in the direction predetermined normal to the main scanning direction, so that the radiation image stored in the sheet 2 is detected over the whole surface of the sheet 2. An electric image signal detected by the photomultiplier 33d is sent to an image processing circuit (not shown)

and subjected therein to a necessary image processing. The electric image signal thus processed is then sent to an image reproducing apparatus. The image reproducing apparatus may be a display device such as a CRT or a recording apparatus for recording the radiation image on a photographic film by optical scanning. Or, the electric image signal may be stored in a storage medium such as a magnetic tape.

The time taken for conducting the image read-out from one sheet 2 is generally longer than the time required for recording a radiation image on the sheet 2. However, it is possible to quickly finish image recording on a plurality of the sheets 2 and maintain the exposed sheets 2 one by one, for example, on a third conveyance system 44 prior to image read-out. Also, for example, Japanese Unexamined Patent Publication No. 58(1983)-89245 discloses a method wherein a read-out operation for detecting the image input information of a radiation image stored in a stimulable phosphor sheet (hereinafter referred to as the preliminary read-out) is conducted in advance by use of stimulating rays having stimulation energy of a level lower than the level of the stimulation energy of stimulating rays used in a read-out operation for obtaining a visible image for viewing, particularly for diagnostic purpose (hereinafter referred to as the final read-out), and thereafter the final read-out is carried out. In the final read-out, the read-out gain is adjusted and/or an appropriate signal processing is conducted to obtain a visible image having an improved image quality, particularly a high diagnostic efficiency and accuracy, regardless of radiation exposure conditions. In the apparatus of the present invention, too, it is possible to conduct the preliminary read-out and the final read-out by returning the sheet 2, which has been sent onto a conveyor belt 45a after image read-out, back to the image read-out position by reversely rotating the conveyor belts 45a and 33e.

After the image read-out is finished, the sheet 2 is conveyed to the erasing means 34 comprising a case 34b and many erasing light sources 34a, e.g. fluorescent lamps, tungsten-filament lamps, xenon lamps, or sodium lamp, arranged within the case 34b. After a shutter 34c is opened, the sheet 2 is conveyed until its forward end contacts nip rollers 34d. The sheet 2 is thus sent into the case 34b by the rotating nip rollers 34d, and then the shutter 34c is closed. The erasing light sources 34a mainly emit light having a wavelength within the stimulation wavelength range for the stimulable phosphor constituting the sheet 2. When the sheet 2 is exposed to the erasing light, the radiation energy remaining on the sheet 2 after the image read-out is released. At this time, since the shutter 34c is closed, no noise is generated in the read-out signal by erasing light leaking into the image read-out means 33.

After the radiation energy remaining on the sheet 2 is erased to such an extent that next image recording on the sheet 2 is possible, nip rollers 34e are rotated and the sheet 2 is conveyed out of the erasing means 34. The circulation and conveyance means 40 receives the sheet 2 carrying a panoramic radiation image stored therein from the image recording box 13 at the image recording section 10, conveys the sheet 2 to the image read-out means 33 and the erasing means 34 to conduct image read-out and erasing of radiation energy remaining on the sheet 2 after the image read-out, and then conveys the erased sheet 2 to the image recording box 13. The circulation and conveyance means 40 comprises a plurality of conveyance systems. Specifically, the means 40 comprises a first conveyance system 41 for conveying the sheet 2 out of the erasing means 34 after the erasing, a second conveyance system 43 having one end facing the second conveyance port 31c for conveying the erased sheet 2 to the conveyance path in the image recording box 13 via the first conveyance port 14b and the second conveyance port 31c and conveying the sheet 2 carrying a radiation image stored therein out of the conveyance path, a third conveyance system 44 for conveying the sheet 2 carrying the radiation image stored therein to the image read-out means 33, a reversely rotatable fourth conveyance system 42 having one end facing the second conveyance system 43 and the other end facing the first conveyance system 41 and the third conveyance system 44 for conveying the erased sheet 2 from the first conveyance system 41 to the second conveyance system 43 by the aid of a guide plate 47 and conveying the sheet 2 carrying a radiation image stored therein from the second conveyance system 43 to the third conveyance system 44, and a fifth conveyance system 45 having a switch-back mechanism for conveying the sheet 2 subjected to the image read-out at the image read-out means 33 to the erasing means 34. At the second conveyance system 43, it is necessary to send the sheet 2, which has been conveyed by the fourth conveyance system 42 from below, laterally towards the second conveyance port 31c. Therefore, the second conveyance system 43 is provided with a guide member 43b for guiding the sheet 2, openable upper rollers 43c for holding the upper end of the sheet 2, an openable shutter 46 for supporting the lower end of the sheet 2 so that the sheet 2 sent to the second conveyance system 43 does not fall, and openable side rollers 43a (shown in FIG. 2) for conveying the sheet 2 into the image recording box 13 via the first conveyance port 14b and the second conveyance port 31c.

Operations of the radiation image recording and read-out apparatus constructed as described above will be described below.

First, the stimulable phosphor sheet 2 erased at the erasing means 34 is conveyed by the first conveyance system 41 and the fourth conveyance system 42 to the second conveyance system 43 (conveyance in the directions as indicated by the arrows C1, C2 and C3). At this time, the shutter 46 of the second conveyance system 43 is opened, and the side rollers 43a are moved away from each other to allow the sheet 2 to be moved upwardly. Therefore, the sheet 2 is conveyed up, and its upper end is held between the upper rollers 43c. Then, the shutter 46 is closed, and the upper rollers 43c release the sheet 2. Also, the side rollers 43a hold the sheet 2 therebetween. At this time, the image recording box 13 is at the predetermined position where the first conveyance port 14b and the second conveyance port 31c face each other. The shutter 15 at the first conveyance port 14b and the shutter 32 at the second conveyance port 31c are opened, and the sheet 2 is conveyed by the side rollers 43a onto the conveyance path 18 in the image recording box 13 via the second conveyance port 31c and the first conveyance port 14b. Thereafter, operations at the image recording section are conducted as described above.

When image recording at the image recording section 10 is finished, the sheet 2 is conveyed to the second conveyance system 43 via the first conveyance port 14b and the second conveyance port 31c. At this time, the side rollers 43a assist the conveyance, and the position sensor 48 detects whether the sheet 2 has been completely conveyed onto the second conveyance system 43. When the sheet 2 is completely conveyed thereonto, the shutter 32 is closed, the side rollers 43a release the sheet 2, and the shutter 46 is opened. Thus the sheet 2 is conveyed to the fourth conveyance system 42 (conveyance in the direction as indicated by the arrow D1), and further to the image read-out means 33 via the fourth conveyance system 42 and the third conveyance system 44 (conveyance in the directions as indicated by the arrows D2 and D3). Thereafter, image read-out is conducted at the image read-out means 33, and the sheet 2 is conveyed by the fifth conveyance system 45 to the erasing section 34 (conveyance in the the directions as indicated by the arrows E1, E2 and E3).

The fifth conveyance system 45 has the switch-back conveyance mechanism as described above. After the image read-out is conducted on the sheet 2 at the image read-out means 33, the sheet 2 is conveyed along a conveyor belt 45a and a guide plate 45b, and then conveyed in the direction as indicated by the arrow E1 by being grasped between conveyor belts 45c and 45d. When a position sensor or the like detects that the sheet 2 has been conveyed until its rear end is grasped between the conveyor belts 45c and 45d, the conveyor belts 45c and 45d are rotated reversely to switch back the sheet 2 in the direction as indicated by the arrow E2. The sheet 2 conveyed by the conveyor belts 45c and 45d in the direction as indicated by the arrow E2 is then grasped between conveyor belts 45e and 45f facing the left ends of the conveyor belts 45c and 45d, and conveyed by the conveyor belts 45e and 45f to the erasing means 34 in the direction as indicated by the arrow E3. At this time, the sheet 2 is moved reversely by the switch-back conveyance, and conveyed to the erasing means 34 with the stimulable phosphor surface facing up so that the stimulable phosphor surface of the sheet 2 is exposed to erasing light emitted by the erasing lamps 34a.

By the aforesaid operations, it is possible to circulate the sheet 2 to conduct recording of a tomographic type panoramic radiation image, image read-out and erasing.

We claim:

1. A tomographic type panoramic radiation image recording and read-out apparatus comprising:
   (i) a tomographic type panoramic image recording section comprising (a) a radiation source (12) for rotating around an object and emitting a radiation to said object, and (b) an image recording box (13) spaced from and positioned to face said radiation source with said object intervening between said image recording box and said radiation source and to rotate around said object together with said radiation source while maintaining said spaced position with respect to said radiation source, and provided with a slit (20a) in a side face facing said radiation source for recording on a stimulable phosphor sheet (2) an image of the radiation entering said image recording box via said slit while simultaneously advancing said stimulable phosphor sheet inside of said image recording box relative to said slit and in synchronization with the rotation of said radiation source;
   (ii) a read-out and erasing section comprising (a) an image read-out means provided with a stimulating ray source for emitting stimulating rays for scanning said stimulable phosphor sheet carrying the tomographic type panoramic radiation image at said image recoridng section, and a photoelectric read-out means for detecting light emitted by said stimulable phosphor sheet scanned with said stimulating rays and converting the emitted light into an electric image signal, (b) an erasing means for, prior to the next image recording on said stimulable phosphor sheet for which the image read-out has been conducted at said image read-out means, releasing the radiation energy remaining on said stimulable phosphor sheet, and
   (iii) (c) a circulation and conveyance means for conveying said stimulable phosphor sheet from said image recording box at said image recording section to said image read-out means and said erasing means, and then to said image read-out means and said erasing means, and then to said image recording box at said image recording section,
   said image recording section being rotatable with respect to said read-out and erasing section.

2. An apparatus as defined in claim 1 wherein said image recording box at said image recording section is provided with a sheet holding means positioned inside of said image recording section for holding said stimulable phosphor sheet, moving said stimulable phosphor sheet in synchronization with the rotation of said image recording box together with said radiation source, and having said stimulable phosphor sheet store the tomographic type panoramic radiation image of said object, and a first conveyance port openable for carrying out conveyance of said stimulable phosphor sheet to and out of said sheet holding means, said read-out and erasing section is provided with a second conveyance port openable for carrying out conveyance of said stimulable phosphor sheet from said sheet holding means in said image recording box to said circulation and conveyance means and from said circulation and conveyance means to said sheet holding means, said first conveyance port and said second conveyance port face with each other with said image recording box and said read-out and erasing section being positioned close to each other at a predetermined position within the range of rotation of said image recording box, and conveyance of said stimulable phosphor sheet is conducted between said sheet holding means and said circulation and conveyance means via said first conveyance port and said second conveyance port.

3. An apparatus as defined in claim 2 wherein said sheet holding means comprises rollers and guide members which constitute a sheet conveyance path associated with said first conveyance port.

4. An apparatus as defined in claim 1 wherein said circulation and conveyance means at said read-out and erasing section comprises a plurality of conveyance systems constituted by conveyor belts and rollers.

5. An apparatus as defined in claim 1 wherein said radiation source is provided with a slit for preventing said object from being exposed to surplus radiation.

* * * * *